United States Patent
Wakizono et al.

(10) Patent No.: US 10,766,312 B2
(45) Date of Patent: *Sep. 8, 2020

(54) PNEUMATIC TIRE

(71) Applicant: Sumitomo Rubber Industries, Ltd., Kobe-shi, Hyogo (JP)

(72) Inventors: Aya Wakizono, Kobe (JP); Yoshiaki Kanematsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 660 days.

This patent is subject to a terminal disclaimer.

(21) Appl. No.: 15/448,266

(22) Filed: Mar. 2, 2017

(65) Prior Publication Data

US 2017/0253090 A1 Sep. 7, 2017

(30) Foreign Application Priority Data

Mar. 4, 2016 (JP) ................... 2016-042415

(51) Int. Cl.
*B60C 11/12* (2006.01)
*B60C 11/13* (2006.01)
(Continued)

(52) U.S. Cl.
CPC ...... *B60C 11/1263* (2013.01); *B60C 11/0306* (2013.01); *B60C 11/04* (2013.01);
(Continued)

(58) Field of Classification Search
CPC ............ B60C 11/1263; B60C 11/1204; B60C 11/1236; B60C 11/0306;
(Continued)

(56) References Cited

U.S. PATENT DOCUMENTS 5,766,383 A * 6/1998 Hasegawa ............... B60C 11/00
152/209.18
5,814,169 A * 9/1998 Yamaguchi ............. B60C 11/11
152/209.22
(Continued)

FOREIGN PATENT DOCUMENTS

| JP | 02-179508 A | * 7/1990 |
| JP | 2006-160055 A | 6/2006 |
| KR | 838443 B1 | * 6/2008 |

OTHER PUBLICATIONS

Translation for Japan 02-179508 (Year: 2019).*
Machine translation for Korea 838443 (Year: 2019).*

*Primary Examiner* — Steven D Maki
(74) *Attorney, Agent, or Firm* — Birch, Stewart, Kolasch & Birch, LLP (57) ABSTRACT

A pneumatic tire comprises a tread portion 2 provided with a circumferential land region 6 provided with a plurality of combined sipes 35 (36, 37). The combined sipes 35 (36, 37) are each composed of a straight portion 34 extending from one edge toward the other edge of the circumferential land region 6, and an arc-shaped portion 33 extending from the straight portion 34 to the other edge of the circumferential land region 6. The combined sipes 35 include a first combined sipe 36 in which the maximum depth of its arc-shaped portion 33 is larger than the maximum depth of its straight portion 34, and a second combined sipe 37 in which the maximum depth of its straight portion 34 is larger than the maximum depth of its arc-shaped portion 33.

19 Claims, 9 Drawing Sheets (51) Int. Cl.
*B60C 11/03* (2006.01)
*B60C 11/04* (2006.01)

(52) U.S. Cl.
CPC ........ *B60C 11/1204* (2013.01); *B60C 11/125* (2013.01); *B60C 11/1236* (2013.01); *B60C 11/1369* (2013.01); *B60C 11/1384* (2013.01); *B60C 11/1392* (2013.01); *B60C 2011/0341* (2013.01); *B60C 2011/0388* (2013.01); *B60C 2011/1268* (2013.01)

(58) Field of Classification Search
CPC ......... B60C 2011/1268; B60C 11/1392; B60C 11/1369; B60C 11/125
See application file for complete search history.

(56) References Cited

U.S. PATENT DOCUMENTS

| | | | |
|---|---|---|---|
| 2008/0156405 A1* | 7/2008 | Tanabe | B60C 11/11 152/209.18 |
| 2010/0193096 A1* | 8/2010 | Hashimoto | B60C 11/12 152/209.18 |
| 2011/0094641 A1* | 4/2011 | Radulescu | B60C 11/0306 152/209.18 |
| 2014/0230980 A1* | 8/2014 | Guichon | B60C 11/0327 152/209.18 |

* cited by examiner

PNEUMATIC TIRE

TECHNICAL FIELD

The present invention relates to a pneumatic tire, more particularly to a siped tread portion capable of improving steering stability on dry roads and running performance on snowy/icy roads.

BACKGROUND ART

Japanese Patent Application Publication No. 2006-160055 discloses a pneumatic tire having a tread portion with land regions provided with straight sipes and L-shaped sipes in order to improve on-the-snow performance. Such straight or L-shaped sipe exert its edge effect to increase a frictional force only in one specific direction or two specific directions. Further, simply providing the circumferential land region with sipes tends to reduce the rigidity of the circumferential land region, and thereby the steering stability on dry roads tends to deteriorate.

SUMMARY OF THE INVENTION

The present invention was therefore made in view of the above, and a primary object of the present invention is to provide a pneumatic tire which is improved in the steering stability on dry roads and running performance on snowy/icy roads by improving the configurations of sipes.

According to the present invention, a pneumatic tire comprises:
a tread portion provided with a circumferential land region, the circumferential land region provided with a plurality of combined sipes each composed of a straight portion extending from one edge toward the other edge of the circumferential land region, and
an arc-shaped portion extending from the straight portion to the other edge of the circumferential land region, and
the combined sipes include
a first combined sipe in which the maximum depth of its arc-shaped portion is larger than the maximum depth of its straight portion, and
a second combined sipe in which the maximum depth of its straight portion is larger than the maximum depth of its arc-shaped portion.

In the pneumatic tire according to the present invention, the straight portion is preferably inclined at an angle of from 30 to 40 degrees with respect to the tire axial direction.

In the pneumatic tire according to the present invention, it is preferable that the angle of the arc-shaped portion with respect to the tire axial direction is gradually decreased from the above-mentioned other edge toward the straight portion.

In the pneumatic tire according to the present invention, it is preferable that the length in the tire axial direction of the straight portion is greater than the length in the tire axial direction of the arc-shaped portion.

In the pneumatic tire according to the present invention, it is preferable that the circumferential land region comprises a plurality of blocks divided by lateral grooves extending across the entire width of the circumferential land region, wherein each of the blocks is provided with a pair of the first combined sipe and the second combined sipe.

In the pneumatic tire according to the present invention, it is preferable that each of the blocks is provided with a longitudinal sipe extending between the first combined sipe and the second combined sipe.

In the pneumatic tire according to the present invention, it is preferable that the lateral grooves include
a first lateral groove provided therein with a tie bar raising from the groove bottom on one side in the tire axial direction, and
a second lateral groove provided therein with a tie bar raising from the groove bottom on the other side in the tire axial direction, and
each of the blocks is disposed between the first lateral groove and the second lateral groove which are adjacent to the block.

In the pneumatic tire according to the present invention, it is preferable that each of the tie bars is provided in its radially outer surface with an in-groove sipe.

In the pneumatic tire according to the present invention, it is preferable that the arc-shaped portion is positioned axially inside the straight portion.

In the pneumatic tire according to the present invention, it is preferable that the angle θ2 of the arc-shaped portion with respect to the tire axial direction is gradually decreased towards the straight portion from the other edge.

In the pneumatic tire according to the present invention, it is preferable that an in-between part of the block between the first combined sipe and the second combined sipe is provided with a chamfer extending obliquely between a ground contacting top surface and a side surface of the in-between part.

In the pneumatic tire according to the present invention, it is preferable that each of the lateral grooves has a main portion inclined in the same direction as the straight portions of the combined sipes, to extend parallel to the straight portions.

In the pneumatic tire according to the present invention, it is preferable that the tread portion is provided with a plurality of the circumferential land regions with the combined sipes, which include a pair of shoulder land regions as the axially outermost circumferential land regions,
each of the shoulder land regions is provided with shoulder lateral grooves which include
first shoulder lateral grooves extending axially outwardly from an axially-inwardly-adjacent shoulder main groove and terminated in a vicinity of the tread edge, and
a second shoulder lateral groove extending axially outwardly from the shoulder main groove beyond the axially outer ends of the first shoulder lateral grooves.

Therefore, in the pneumatic tire according to the present invention, the combined sipes can provide a frictional force by the edges of the arc-shaped portions which is in a different direction from a frictional force which is provided by the straight portions, and as a result, the steering stability on snowy/icy roads is improved.

Moreover, owing to the arc-shaped portions, the opposite side walls of the combined sipe contact with each other and engaged with each other when subjected to lateral force during running, and the apparent lateral rigidity of the circumferential land region can be increased. Therefore, the steering stability on dry roads is maintained.

Further, the first combined sipes and second combined sipes can maintain the rigidity of the circumferential land region by their portions having the small depths, while providing a large frictional force by the edges of their portions having the larger depths. Therefore, the running performance on snowy/icy roads and the steering stability on dry roads can be improved in a good balance.

Furthermore, in such first combined sipes and second combined sipes, it is possible to disperse the portions (with the small depths) for maintaining the rigidity of the circumferential land region to further uniform the rigidity distribution in the circumferential land region and thereby to suppress uneven wear of the circumferential land region.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The tread edges Te are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

The term "sipe" means a narrow groove having a width not more than 1.5 mm inclusive of a cut having no substantial width.

DESCRIPTION OF THE PREFERRED EMBODIMENTS

An embodiment of the present invention will now be described with reference to the accompanying drawings.

The present invention can be applied to various pneumatic tires and suitably applied to winter tires for passenger cars.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
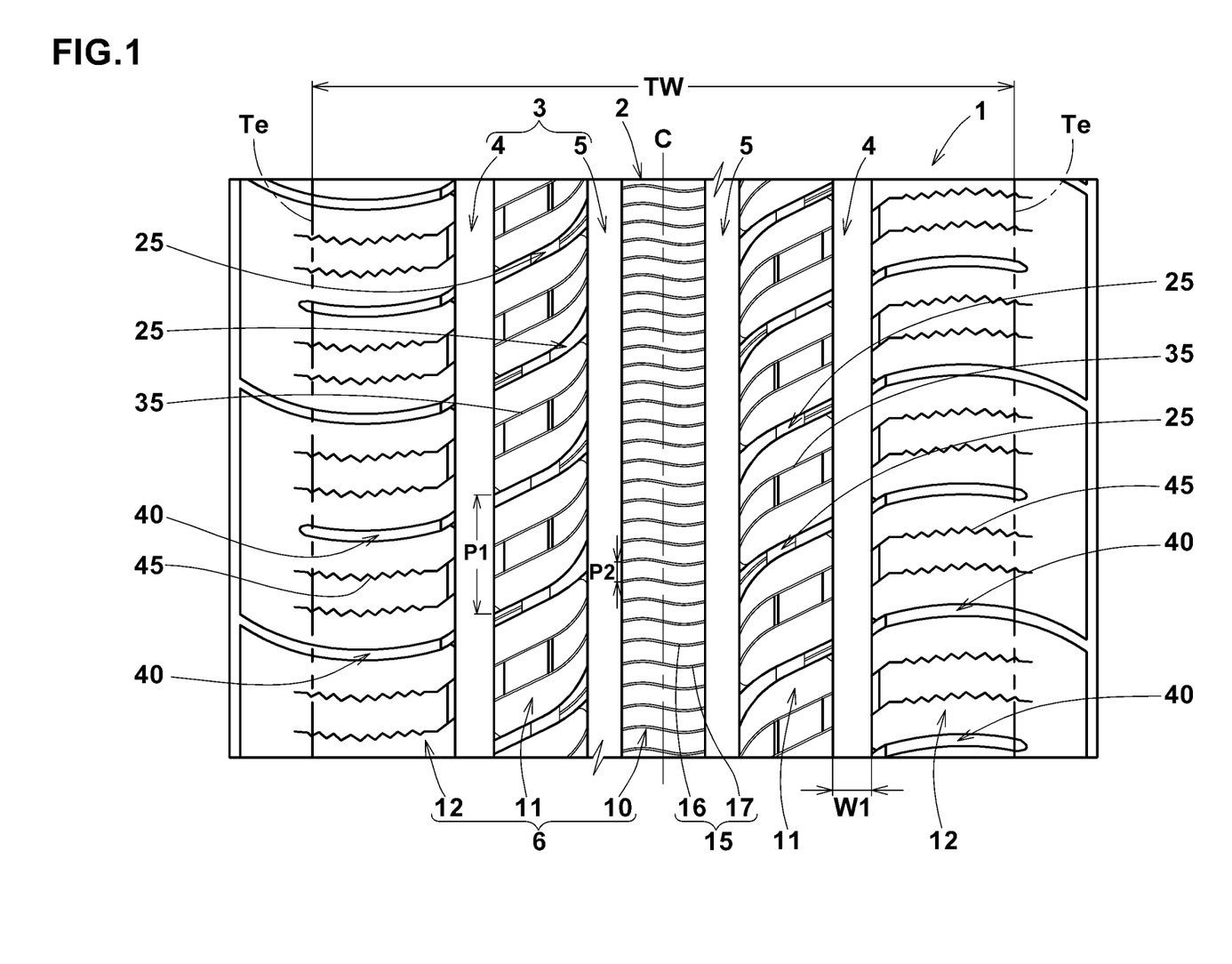
FIG. 1 is a developed partial view of the tread portion of a pneumatic tire as an embodiment of the present invention.

FIG. 1 shows the tread portion 2 of a pneumatic tire 1 as an embodiment of present invention which is a winter tire for passenger cars.

In FIG. 1, the tread portion 2 is provided with circumferentially continuously extending main grooves 3 to axially divide the tread portion 2 into land regions 6.

In this embodiment, the main grooves 3 are an axially inner crown main groove 5 and an axially outer shoulder main groove 4 which are disposed on each side of the tire equator C, therefore, the tread portion 2 is divided into five land regions 6. According to the present invention, however, it is also possible that the main grooves 3 are the two axially outer shoulder main grooves 4 and one crown main groove 5 therebetween, therefore, the tread portion 2 is divided into four land regions 6, for example.

The main grooves 4 and 5 can be straight grooves, zigzag grooves, smoothly curved wavy grooves or a combination of straight, zigzag and/or wavy grooves. In this embodiment, each of the main grooves 4 and 5 is a straight groove.

Preferably, the groove width W1 of each of the main grooves 4 and 5 is set in a range from 2% to 9% of the tread width TW. Preferably, the groove depth of each of the main grooves 4 and 5 is set in a range from 5.0 to 15.0 mm.

Such main grooves 4 and 5 serve to improve the steering stability on dry roads and the running performance on snowy/icy roads in a good balance.

As shown in FIG. 1, the circumferential land regions 6 in this embodiment are one crown land region 10, two middle land regions 11 and two shoulder land regions 12.

The middle land regions 11 are defined between the crown main grooves 5 and the shoulder main grooves 4.

Figure 2:
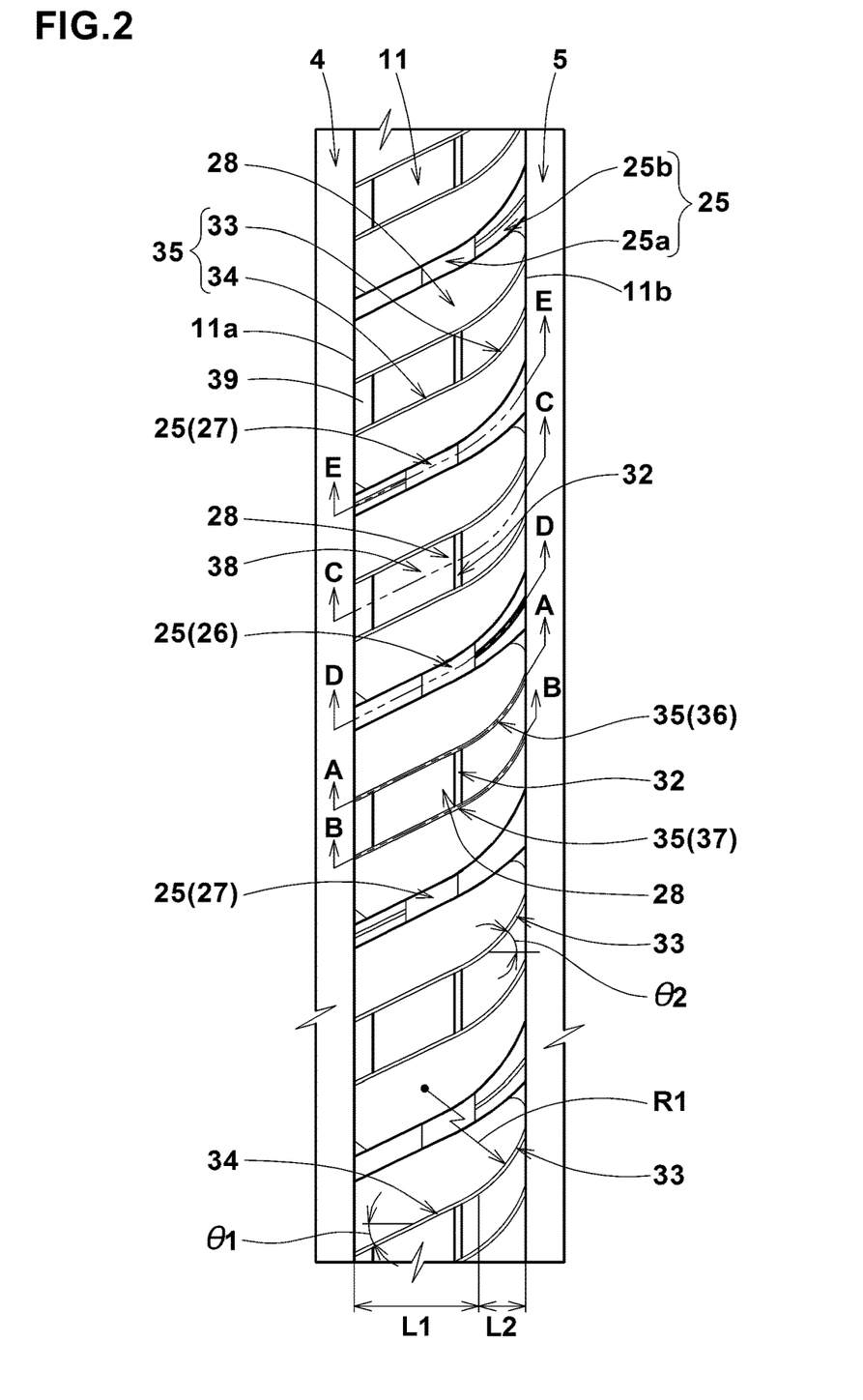
FIG. 2 is a partial top view of a middle land region of the tread portion shown in FIG. 1.

Each of the middle land region 11 is provided with a plurality of lateral grooves 25 extending across the entire width of the middle land region 11. Thereby, the middle land region 11 is circumferentially divided into blocks 28 circumferentially arranged in a single circumferential row.

The blocks 28 are provided with combined sipes 35.

The combined sipe 35 is composed of a straight portion 34 extending linearly from one edge 11a toward the other edge 11b of the middle land region 11 in the tire axial direction, and an arc-shaped portion 33 extending from the straight portion 34 to the other edge 11b while curving in an arc shape.

Thus, the combined sipe 35 extends across the entire width of the middle land region 11.

Such combined sipe 35 can provide a frictional force by the edges of the arc-shaped portion 33 which force is in a different direction from a frictional force provided by the straight portion 34. Therefore, the steering stability on snowy/icy roads can be improved. Moreover, owing to the arc-shaped portion 33, the opposite side walls of the combined sipe 35 contact with each other when subjected to lateral force during running, and the portions on both sides of the combined sipe 35 are engaged with each other. Thus, the apparent lateral rigidity of the land region is increased, and the steering stability on dry roads is maintained.

It is preferable that the length L1 in the tire axial direction of the straight portion 34 is greater than the length L2 in the tire axial direction of the arc-shaped portion 33. Specifically, the length L1 of the straight portion 34 is preferably 2.5 to 3.0 times the length L2 of the arc-shaped portion 33. As a result, wear of the middle land region 11 in its axially outside part can be suppressed.

It is preferable that the straight portion 34 is inclined at an angle θ1 of 30 to 40 degrees with respect to the tire axial direction. Such straight portion 34 serves to improve the frictional force in the tire circumferential direction and the frictional force in the tire axial direction in a good balance.

It is preferable that the arc-shaped portion 33 is positioned axially inside the straight portion 34 in order to enhance the rigidity of the middle land region 11 in its axially inside part and thereby to help the improvement of the steering stability on dry roads.

It is preferable that the angle θ2 of the arc-shaped portion 33 with respect to the tire axial direction is gradually decreased towards the straight portion 34 from the other edge 11b. Such arc-shaped portion 33 is possible to effectively cut the water film on the road surface during wet traveling, The radius R1 of curvature of the arc-shaped portion 33 is preferably not less than 10 mm, more preferably not less than 20 mm, and preferably not greater than 40 mm, more preferably not greater than 30 mm.
If the radius R1 of curvature is less than 10 mm, there is a possibility that uneven wear occurs in the vicinity of the arc-shaped portion 33. If the radius R1 of curvature is greater than 40 mm, there is a possibility that the above-described effect is reduced.

The combined sipes 35 include a first combined sipe 36 and a second combined sipe 37 which have different depth distributions.

Figure 3A:
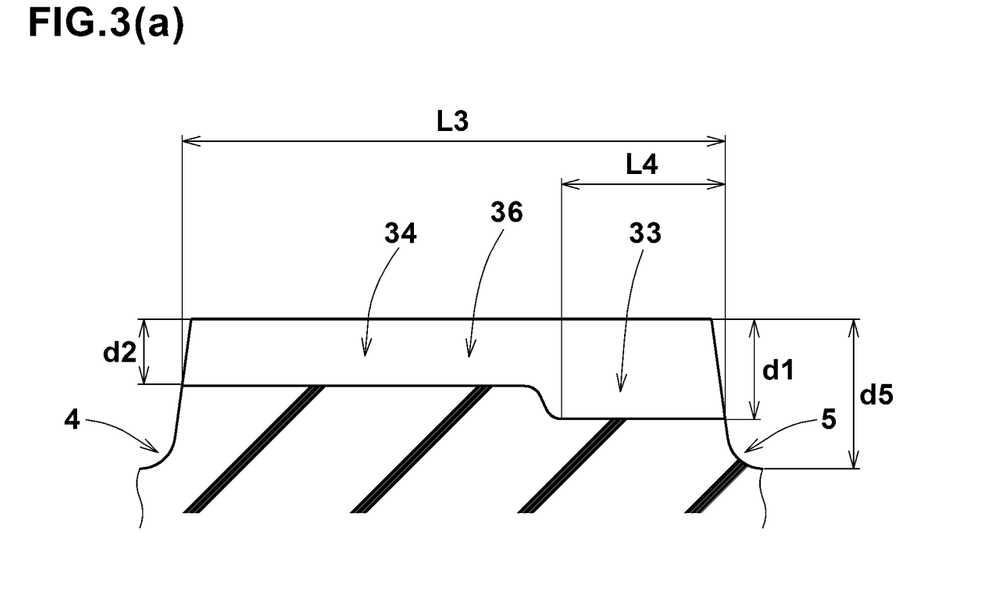
FIG. 3(a) is a cross-sectional view of a first combined sipe taken along line A-A in FIG. 2.

The first combined sipe 36 has a groove depth distribution as shown in FIG. 3(a), wherein the maximum depth d1 of the arc-shaped portion 33 is greater than the maximum depth d2 of the straight portion 34.

Figure 3B:
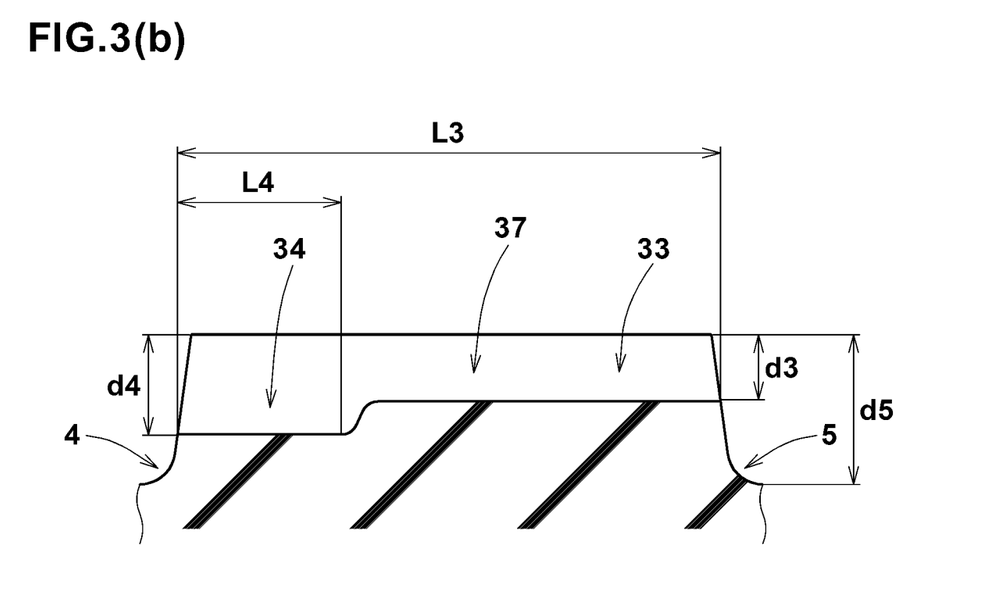
FIG. 3(b) is a cross-sectional view of a second combined sipe taken along line B-B in FIG. 2.

The second combined sipe 37 has a groove depth distribution as shown in FIG. 3(b), wherein the maximum depth d3 of the arc-shaped portion 33 is smaller than the maximum depth d4 of the straight portion 34.

In the first combined sipe 36 and second combined sipe 37 configured as such, it is possible to maintain the rigidity of the circumferential land region by their portions having the smaller depths, and at the same time, it is possible to provide a large friction force by the edges of the portions having the larges depths. Therefore, the running performance on snowy/icy roads and the steering stability on dry roads can be improved in a good balance. Further, the first combined sipes 36 and second combined sipes 37 can disperse the portions (with the smaller depths) for maintaining the rigidity of the circumferential land region to further uniform the rigidity distribution in the circumferential land region. Thus, uneven wear of the circumferential land region can be effectively suppressed.

In order to achieve both of the steering stability on dry roads and the running performance snowy/icy roads, it is preferred that the maximum depth d1 of the arc-shaped portion 33 of the first combined sipe 36 and the maximum depth d4 of the straight portion 34 of the second combined sipe 37 are set in a range from 0.65 to 0.75 times the depth d5 of the crown main groove 5. And, it is preferred that the maximum depth d2 of the straight portion 34 of the first combined sipe 36 and the maximum depth d3 of the arc-shaped portion 33 of the second combined sipe 37 are set in a range from 0.45 to 0.55 times the depth d5 of the crown main groove 5.

From the same point of view, in each of the combined sipes 36 and 37, it is preferable that the length L4 in a tire axial direction of a portion whose depth is increased is 0.30 to 0.40 times the length L3 in the tire axial direction of the combined sipe.

In this embodiment, as shown in FIG. 2, each of the blocks 28 is provided with a pair of the first combined sipe 36 and the second combined sipe 37. Thereby, it is possible to suppress uneven wear of the block 28.

Further, the block 28 is preferably provided with a longitudinal sipe 32 extending from the first combined sipe 36 to the second combined sipe 37. The longitudinal sipes 32 is preferably disposed axially inside the axial center position of the block 28. Such longitudinal sipes 32 can enhance the cornering performance on snowy/icy roads.

Figure 4:
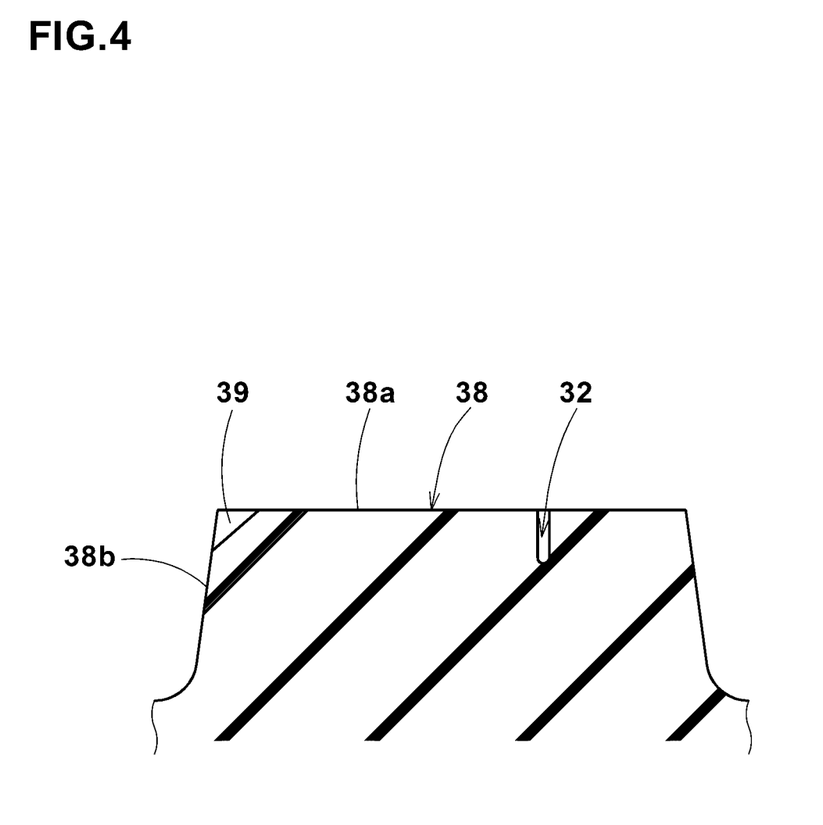
FIG. 4 is a sectional view of the middle land region taken along line C-C in FIG. 2.

FIG. 4 shows a cross section of the in-between part 38 between the first combined sipe 36 and the second combined sipe 37 taken along line C-C in FIG. 2.
It is preferable that a corner of the in-between part 38 is chamfered with a surface 39 extending obliquely between the ground contacting top surface 38a and the side surface 38b of the in-between part 38. When traveling on snow, such chamfered surface 39 serves to form a larger snow block together with the shoulder main grooves 4.

In this embodiment, as shown in FIG. 2, the above-mentioned lateral groove 25 is composed of
a main portion 25a extending straight, for example, at an angle of from 30 to 40 degrees with respect to the tire axial direction, and
a curved portion 25b extending axially inwardly from the main portion 25a in a curved manner.

The main portion 25a is preferably inclined in the same direction as the straight portion 34 of the combined sipe 35. In this embodiment, the main portion 25a extends parallel to the straight portion 34. Such main portion 25a can suppress uneven wear of the middle land region 11.

In this embodiment, the curved portion 25b is curved such that its angle with respect to the tire axial direction is gradually decreased toward the main portion 25a, while preferably inclining to the same direction as the combined Sipe 35. Such a curved portion 25b helps to smoothly guide the water in the crown main groove 5 toward the axially outside of the tire, while suppressing the uneven wear of the middle land region 11.

It is preferable that the curved portion 25b has a gradually widening part which is opened at the crown main groove 5 and whose groove width is gradually increased toward the crown main groove 5 as shown in FIG. 2. Such curved portion 25b can effectively guide the water in the crown main groove 5 toward the axially outside when traveling in wet conditions.

Figure 5A:
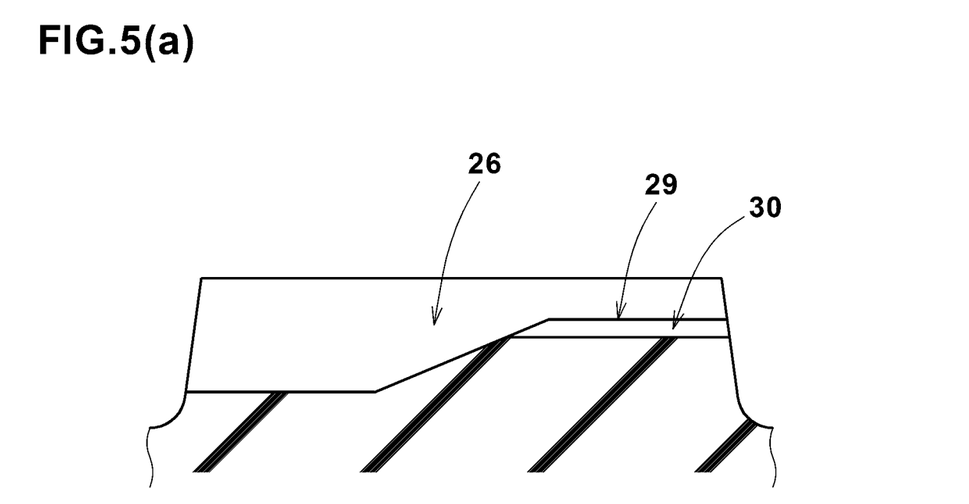
FIG. 5(a) is a cross-sectional view of a first lateral groove taken along line D-D in FIG. 2.
Figure 5B:
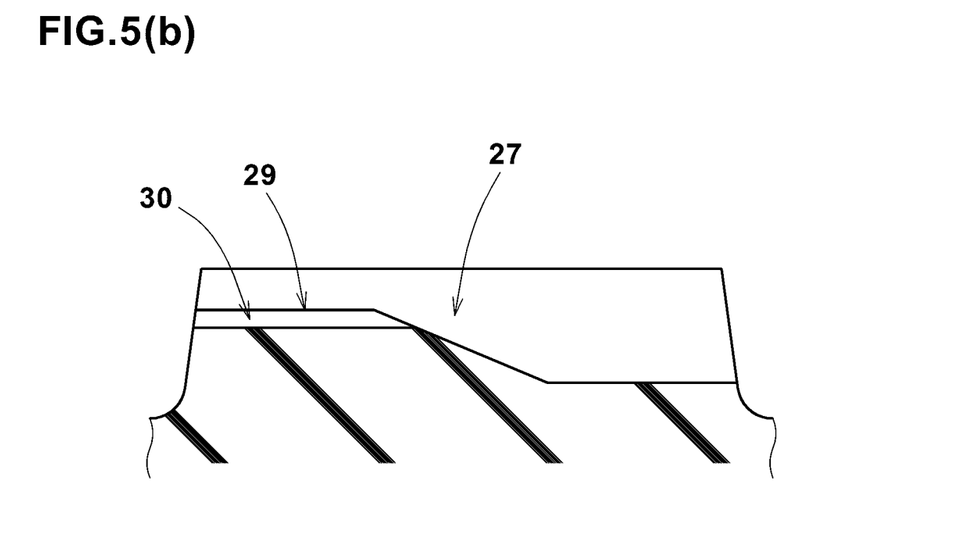
FIG. 5(b) is a cross-sectional view of a second lateral groove taken along line E-E in FIG. 2.

In this embodiment, the lateral grooves 25 include a first lateral groove 26 and a second lateral groove 27 having different depth distributions or variations.
For example, the depth of the first lateral groove 26 is varied as shown in FIG. 5(a), and the depth of the second lateral groove 27 is varied as shown in FIG. 5(b).
As shown, the first lateral groove 26 is provided with a tie bar 29 where the groove bottom is partially raised, on one side in the tire axial direction (in this example, axially inside), whereas the second lateral grooves 27 is provided with a tie bar 29 where the groove bottom is partially raised, on the other side in the tire axial direction (in this example, axially outside). Such first and second lateral grooves 16 and 27 can maintain the rigidity of the middle land region 11 and help to maintain the steering stability on dry roads.

Preferably, the tie bars 29 of the first and second lateral grooves are each provided in the radially outer surface thereof with an in-groove sipe 30 extending along the longitudinal direction of the lateral groove.
Such in-groove sipe 30 can make the lateral groove 25 open easily when traveling on snow, without impairing the reinforcing effect of the tie bar 29, and thereby it is possible to suppress the snow clogging of the lateral groove 25.

In this embodiment, as shown in FIG. 2, the first lateral groove 26 and the second lateral groove 27 are disposed alternately in the tire circumferential direction. Thus, each of the blocks 28 is defined between a pair of the first lateral groove 26 and the second lateral groove 27. Such alternate arrangement of the first and second lateral grooves 26 and 27 can further the uniform rigidity distribution of the middle land region 11.

In each middle land region 11, it is preferable that
the first combined sipe 36, of which depth is greater on its axially inside, is disposed on each side in the tire circumferential direction of each of the first lateral grooves 26 in which the tie bar 29 is disposed in its axially inside, and
the second combined sipe 37, of which depth is greater on its axially outside, is disposed on each side in the tire circumferential direction of each of the second lateral grooves 27 in which the tie bar 29 is disposed in its axially outside. Thereby, the rigidity distribution of the middle land region 11 becomes more uniform, and uneven wear of the middle land region 11 is effectively suppressed.

Figure 6:
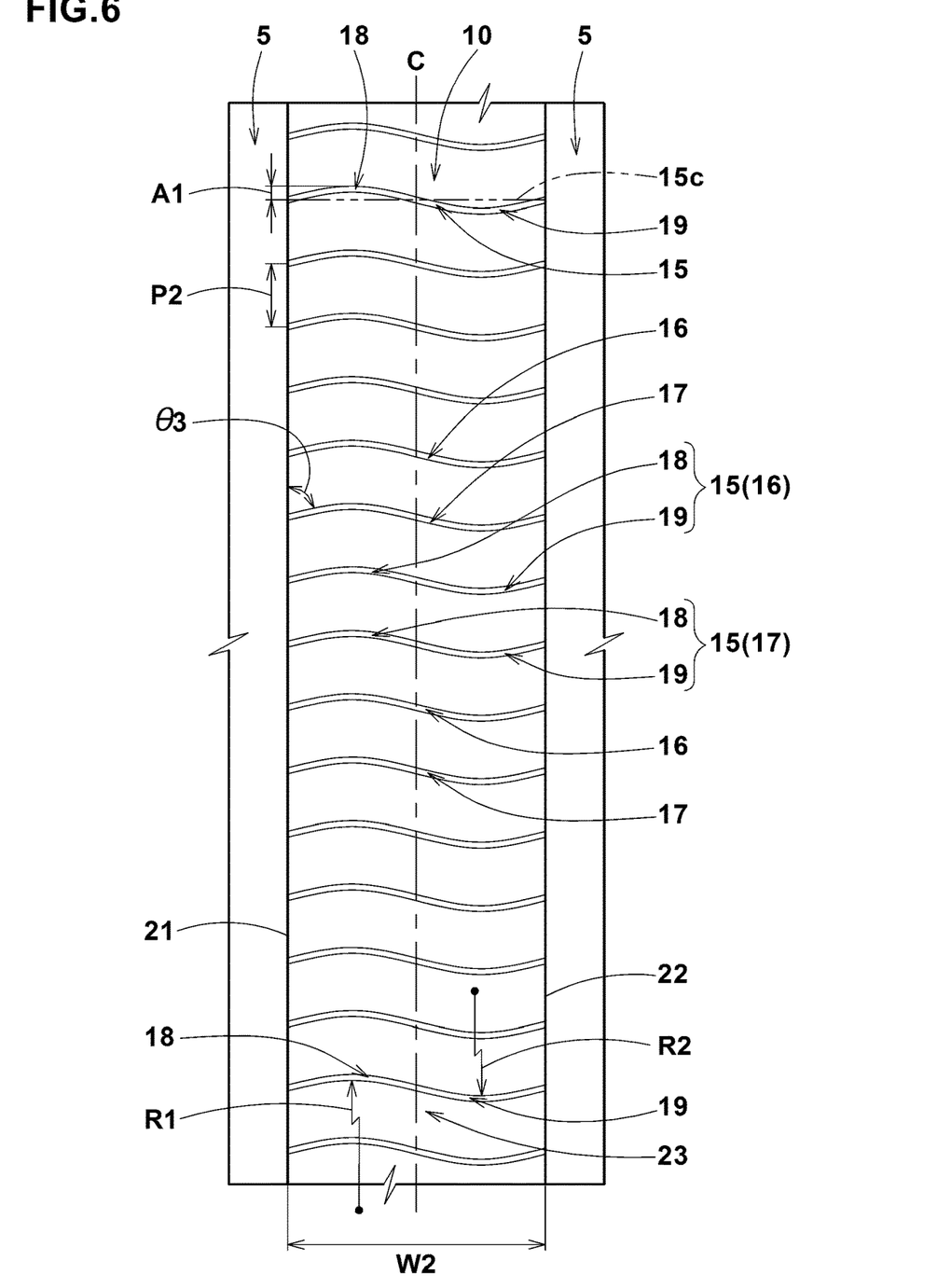
FIG. 6 is a partial top view of a crown land region of the tread portion shown in FIG. 1.

In this embodiment, as shown in FIG. 6, the above-mentioned crown land region 10 defined between the crown main grooves 5 is centered on the tire equator c. And the crown land region 10 is provided with a plurality of the lateral sipes 15 extending across the entire width of the crown land region. In this embodiment, only the lateral sipes 15 exist in the crown land region 10, and lateral grooves for the purpose of drainage are not provided. Thus, the crown land region 10 is formed as a circumferentially continuous rib in substance so that the crown land region 10 can maintain its high rigidity so as to be able to maintain the steering stability on dry roads.

As shown in FIG. 1 and FIG. 6, the pitch P2 in the tire circumferential direction of the lateral sipes 15 is preferably set in a range from 0.20 to 0.35 times the pitch P1 in the tire circumferential direction of the middle lateral grooves 25. Such lateral sipes 15 can effectively improve the running performance on snowy/icy roads.

Each of the lateral sipes 15 is wavy and composed of a first portion 18 and a second portion 19 connected with each other. The first portion 18 has an arc-shape in its top view which is convex toward one side in the tire circumferential direction (upward in FIG. 6). The second portion 19 has an arc-shape in its top view which is convex toward the other side in the tire circumferential direction (downward in FIG. 6). Such lateral sipes 15 can increase not only the frictional force in the tire circumferential direction but also the frictional force in the tire axial direction.

The lateral sipe 15 can exert a high frictional force toward substantially all directions owing to the cooperation between the first portion 18 and the second portion 19. Accordingly, the cornering performance on snowy/icy roads is improved. Moreover, the portions of the crown land region 10 subdivided by the lateral sipes can be prevented from shifting in the axial direction owing to the wavy configuration since the sipes' walls facing each other are in contact with each other during running and the sipes' walls are engaged with each other. Thus, the apparent lateral rigidity of the crown land region 10 is increased, and the steering stability on dry roads can be maintained.

The wavy configuration of the lateral sipe 15 in this embodiment is substantially one cycle formed by one first portion 18 and one second portion 19. However, the lateral sipe 15 is not limited to such configuration. For example, the lateral sipe 15 may have a wavy configuration of plural cycles having plural amplitudes by providing plural first portions 18 and plural second portions 19.

It is preferable that the amplitude center line 15c of the wave of the lateral sipe 15 is at an angle of less than 15 degrees with respect to the tire axial direction. In this embodiment, the amplitude center line 15c is parallel with the tire axial direction. Such lateral sipes 15 can effectively prevent uneven wear of the crown land region 10.

In the first portion 18 and the second portion 19, the maximum amplitude A1 from the amplitude center line 15c is preferably set in a range from 0.20 to 0.30 times the pitch P2 of the lateral sipes 15. If the maximum amplitude A1 is less than 0.20 times the pitch P2, there is a possibility that the effects described above are reduced. If the maximum amplitude A1 is greater than 0.30 times the pitch P2, which may cause uneven wear of the crown land region 10.

The intersecting angle θ3 of the transverse sipe 15 with the crown main groove 5 is preferably set in a range from 70 to 90 degrees. Thus, it is possible to suppress damage of the crown land region 10 starting from the corners formed in the vicinity of the open end of the lateral sipe 15.

The first portion 18 is curved at a constant radius R1 of curvature from one of the edges 21 of the crown land region 10 to a central position 23 in the tire axial direction of the crown land region 10, The second portion 19 is curved at a constant radius R2 of curvature from the other edge 22 of the crown land region 10 to the central position 23. Such lateral sipe 15 can exerts multidirectional frictional force by the edges, and helps to prevent stress concentration in a part of the crown land region 10.

In order to effectively derive the above-described effects, it is preferred that each of the radii R1 and R2 of curvature is set in a range of not less than 15 mm, more preferably not less than 18 mm, and not more than 25 mm, more preferably not more than 22 mm.

Figures 7A, 7B, 7C:
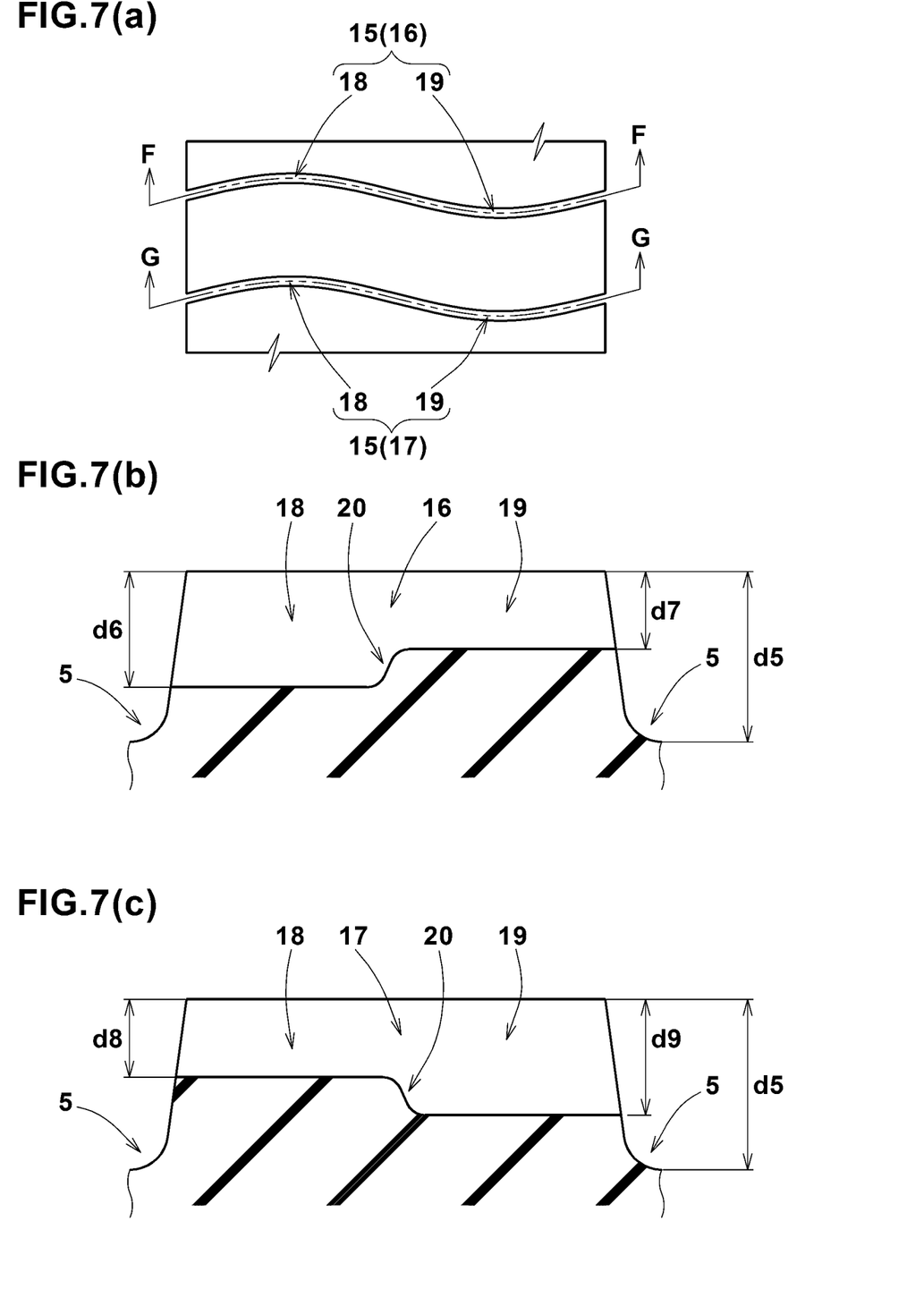
FIG. 7(a) is top views of a first lateral sipe and a second lateral sipe in FIG. 6.
FIG. 7(b) is a cross-sectional view of the first lateral sipe taken along line F-F in FIG. 7(a).
FIG. 7(c) is a cross-sectional view of the second lateral Sipe taken along line G-G in FIG. 7(a).

The lateral sipes 15 include a first lateral sipe 16 and a second lateral sipe 17 which have different depth distributions or variations although their configurations are the same in the top views as shown in FIG. 7(a).
In the first lateral sipe 16, as shown in FIG. 7(b), the depth d6 of the first portion 18 is greater than the depth d7 of the second portion 19. In contrast, in the second lateral sipe 17, as shown in FIG. 7(c), the depth d9 of the second portion 19 is greater than the depth d8 of the first portion 18.

Such first lateral sipes 16 and second lateral sipes 17 can maintain the rigidity of the circumferential land region by their portions having the small depths, and at the same time, it is possible to provide a large frictional force by the edges of their portions having the greater depths.

Further, in the first lateral sipes 16 and second lateral sipes 17 configured as such, since the portions for maintaining the rigidity of the circumferential land region are dispersed, the rigidity distribution of the circumferential land region becomes further uniformed, and therefore, uneven wear of the circumferential land region can be suppressed.

It is preferable that at least part of the first portion 18 has a constant depth in the tire axial direction, and at least part of the second portion 19 has a constant depth in the tire axial direction. In this embodiment, the substantially entire length of the first portion 18 has a constant depth, and the substantially entire length of the second portion 19 has a constant depth, and the depth of the lateral sipe 15 is changed only in a portion including the connecting position 20 between the first portion 18 and the second portion 19.

The crown land region 10 provided with such lateral sipes 15 (16 and 17) may have different rigidities in its different portions in the tire axial direction, therefore, the tapping sound generated from the portions tapping at the road surface during driving on dry roads can be changed into a white noise.

It is preferable that the depth d6 of the first portion 18 of the first lateral sipes 16 and the depth d9 of the second portion 19 of the second lateral sipes 17 are set in a range from 0.65 to 0.75 times the depth d5 of the crown main groove 5, and the depth d7 of the second portion 19 of the first lateral sipes 16 and the depth d8 of the first portion 18 of the second lateral sipes 17 are set in a range from 0.45 to 0.55 times the depth d5 of the crown main groove 5.

Such first lateral sipes 16 and second lateral sipes 17 can maintain the rigidity of the crown land region 10, while providing a significant frictional force by their edges.

The first lateral sipe 16 and the second lateral sipe 17 are each disposed periodically in the tire circumferential direction. A typical periodic arrangement is an alternate arrangement. In this embodiment, as shown in FIG. 6, the first lateral sipes 16 and the second lateral sipes 17 are alternately arranged in the tire circumferential direction in order that the rigidity distribution of the crown land region 10 becomes uniform and thereby to suppress uneven wear of the crown land region 10. However, it is also possible to arrange two or more first lateral sipes 16 and two or more second lateral sipes 17 alternately.

Figure 8:
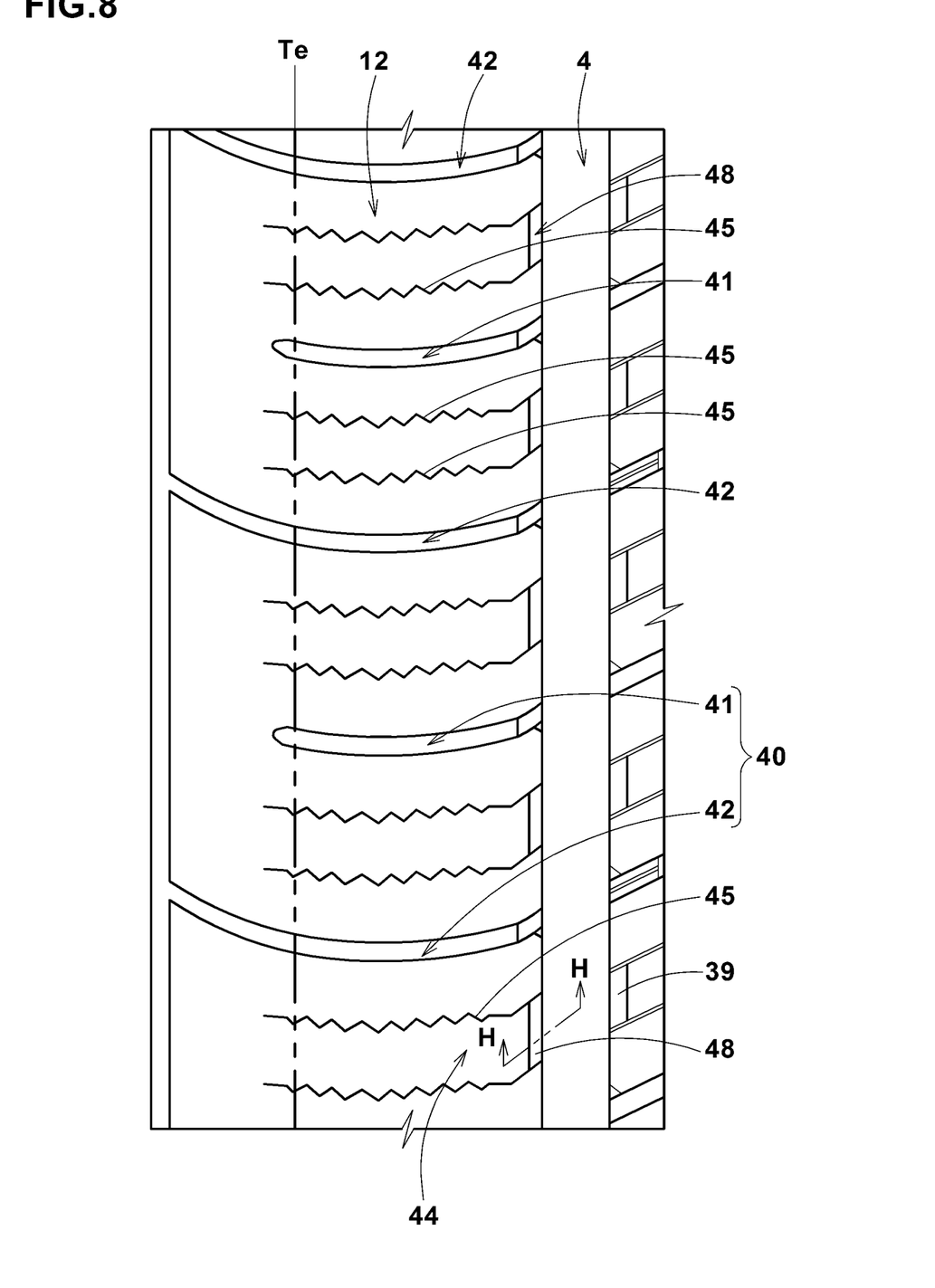
FIG. 8 is a partial top view of a shoulder land region of the tread portion shown in FIG. 1.

The above-mentioned shoulder land regions 12 are defined as being axially outside the respective shoulder main grooves 4. As shown in FIG. 8, each of the shoulder land regions 12 is provided with a plurality of shoulder lateral grooves 40 and a plurality of shoulder sipes 45.

In this embodiment, the shoulder lateral grooves 40 include a first shoulder lateral groove 41 extending axially outwardly from the shoulder main groove 4 and terminated in the vicinity of the tread edge Te, and a second shoulder lateral groove 42 extending axially outwardly from the shoulder main groove 4 beyond the axially outer ends of the first shoulder lateral groove 41. Preferably, the first shoulder lateral groove 41 and the second shoulder lateral groove 42 are alternately arranged in the tire circumferential direction. Such first shoulder lateral grooves 41 and second shoulder lateral grooves 42 can enhance the steering stability on dry roads and the wandering performance on snowy/icy roads in a good balance.

Between the first shoulder lateral grooves 41 and the second shoulder lateral grooves 42, there are disposed shoulder sipes 45. In this embodiment, between every two of the circumferentially adjacent first and second shoulder lateral grooves 41 and 42, two shoulder sipes 45 are disposed. In other words, the shoulder blocks circumferentially divided by the shoulder lateral grooves 40 (41 and 42) are each provided with a pair of shoulder sipes 45.

The shoulder sipe 45 in this example extends axially outwardly from the shoulder main groove 4 in a zigzag manner. Such shoulder sipe 45 serves to increase the apparent rigidity of the shoulder land region 12.

Figure 9:
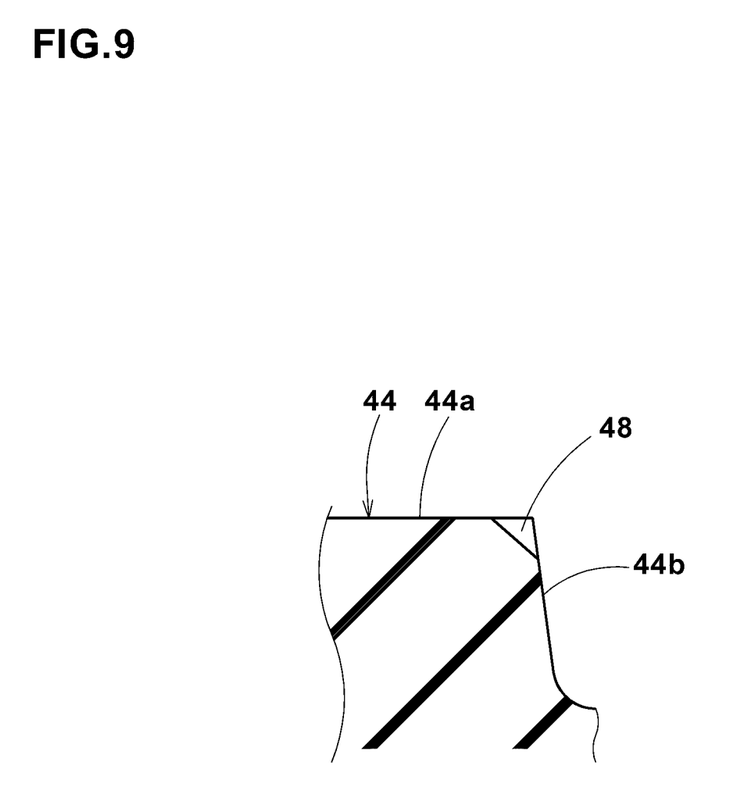
FIG. 9 is a cross-sectional view of the shoulder land region taken along line H-H in FIG. 8.

The subdivided part 44 of each shoulder block between the two adjacent shoulder sipes 45 is chamfered in a corner by an inclined surface (chamfer) 48 extending between the ground contacting top surface 44a and a side surface 44b of the subdivided part 44 as shown in FIG. 9.

Further, it is preferable that, as shown in FIG. 8, the chamfers 48 formed in the shoulder land region 12 are at least partially overlapped in the tire circumferential direction with the respective chamfers 39 formed in the middle land region 11 adjacent to the shoulder main groove 4 through the shoulder main groove 4. As a result, when traveling on snow, larger snow blocks are formed, and larger shearing force can be obtained therefrom.

While detailed description has been made of a preferable embodiment of the present invention, the present invention can be embodied in various forms without being limited to the illustrated embodiment.

Comparative Tests

Based on the tread pattern shown in FIG. 1, pneumatic tires of size 215/60R16 (rim size 16×6J) were experimentally manufactured as test tires (including working examples Ex1-Ex11 and Comparative example Ref1) and tested for the braking performance and cornering performance on icy/snowy roads and steering stability on dry roads, using a 2400 cc front-wheel-drive test car with tire tires mounted on all of the wheels and inflated to 240 kPa.

Specifications of the test tires are listed in Table 1.

<Braking Performance and Cornering Performance on Snowy/Icy Roads>

Using the above-mentioned test car, a test driver evaluated the braking performance and cornering performance when braking and making cornering on icy/snowy road surfaces. The results are indicated in Table 1 by an index based on Comparative example Ref1 being 100, wherein the larger the index number, the better the braking and cornering performances.

<Steering Stability on Dry Roads>

Using the test car, the test driver evaluated the steering stability when running on dry roads.

The results are indicated in Table 1 by an index based on Comparative example Ref1 being 100, wherein the larger the index number, the better the steering stability.

TABLE 1

| Tire | Ref1 | Ex1 | Ex2 | Ex3 | Ex4 | Ex5 |
|---|---|---|---|---|---|---|
| maximum depth d1 of arc-shaped portion of 1st combined sipe/crown main groove depth d5 | 0.60 | 0.70 | 0.60 | 0.65 | 0.75 | 0.80 |
| maximum depth d2 of straight portion of 1st | 0.60 | 0.50 | 0.50 | 0.50 | 0.50 | 0.50 |

TABLE 1-continued

| | | | | | | |
|---|---|---|---|---|---|---|
| combined sipe/crown main groove depth d5 | | | | | | |
| maximum depth d3 of arc-shaped portion of 2nd combined sipe/crown main groove depth d5 | 0.60 | 0.50 | 0.50 | 0.50 | 0.50 | 0.50 |
| depth d4 of straight portion of 2nd combined sipe/crown main groove depth d5 | 0.60 | 0.70 | 0.60 | 0.65 | 0.75 | 0.80 |
| presence(P)/absence(A) of longitudinal sipe | P | P | P | P | P | P |
| presence(P)/absence(A) of in-groove sipe | P | P | P | P | P | P |
| braking performance on snowy/icy roads | 100 | 110 | 108 | 109 | 110 | 111 |
| cornering performance on snowy/icy roads | 100 | 113 | 109 | 112 | 113 | 113 |
| steering stability on dry roads | 100 | 110 | 111 | 110 | 108 | 105 |

| Tire | Ex6 | Ex7 | Ex8 | Ex9 | Ex10 | Ex11 |
|---|---|---|---|---|---|---|
| maximum depth d1 of arc-shaped portion of 1st combined sipe/crown main groove depth d5 | 0.70 | 070 | 0.70 | 0.70 | 0.70 | 0.70 |
| maximum depth d2 of straight portion of 1st combined sipe/crown main groove depth d5 | 0.40 | 0.45 | 0.55 | 0.60 | 0.50 | 0.50 |
| maximum depth d3 of arc-shaped portion of 2nd combined sipe/crown main groove depth d5 | 0.40 | 0.45 | 0.55 | 0.60 | 0.50 | 0.50 |
| depth d4 of straight portion of 2nd combined sipe/crown main groove depth d5 | 0.70 | 0.70 | 0.70 | 0.70 | 0.70 | 0.70 |
| presence(P)/absence(A) of longitudinal sipe | P | P | P | P | A | P |
| presence(P)/absence(A) of in-groove sipe | P | P | P | P | P | A |
| braking performance on snowy/icy roads | 107 | 109 | 110 | 110 | 108 | 110 |
| cornering performance on snowy/icy roads | 110 | 111 | 113 | 113 | 110 | 108 |
| steering stability on dry roads | 112 | 110 | 109 | 107 | 107 | 111 |

From the test results, it was confirmed that working examples according to the present invention were improved in the steering stability on dry roads and the running performance on icy/snowy roads.

DESCRIPTION OF THE REFERENCE SIGNS 2 tread portion
6 land region
33 arc-shaped portion
34 straight portion
35 combined sipe
36 first combined sipes
37 second combined sipes

The invention claimed is:

1. A pneumatic tire, comprising:
a tread portion provided with a circumferential land region, the circumferential land region provided with a plurality of combined sipes,
wherein:
each of the combined sipes is composed of
a straight portion extending from one edge toward the other edge of the circumferential land region, and
an arc-shaped portion extending from the straight portion to the other edge of the circumferential land region, and
the combined sipes include
a first combined sipe in which the maximum depth of its arc-shaped portion is larger than the maximum depth of its straight portion, and
a second combined sipe in which the maximum depth of its straight portion is larger than the maximum depth of its arc-shaped portion,
the circumferential land region comprises a plurality of blocks divided by lateral grooves extending across the entire width of the circumferential land region,
each of the blocks is provided with a pair of the first combined sipe and the second combined sipe, and
a chamfer extending obliquely between a ground contacting top surface and a side surface of the block is provided on only an in-between part of the block between the first combined sipe and the second combined sipe.

2. The pneumatic tire according to claim 1, wherein
the tread portion is provided on each side of the tire equator with an axially inner crown main groove and an axially outer shoulder main groove both extending continuously in the tire circumferential direction,
said circumferential land region is defined between the crown main groove and the shoulder main groove on each side of the tire equator.

3. The pneumatic tire according to claim 2, wherein
the tread portion comprises a shoulder land region defined between said shoulder main groove and an adjacent tread edge,
the shoulder land region is circumferentially divided by shoulder lateral grooves into shoulder blocks, and
the shoulder blocks are each provided with zigzag sipes extending thereacross.

4. The pneumatic tire according to claim 3, wherein
the number of the zigzag sipes is two per each shoulder block, and
a chamfer extending obliquely between a ground contacting top surface and a side surface of the shoulder block is provided only between the two zigzag sipes.

5. A pneumatic tire, comprising:
a tread portion provided with a circumferential land region, the circumferential land region provided with a plurality of combined sipes,
wherein:
each of the combined sipes is composed of
a straight portion extending from one edge toward the other edge of the circumferential land region, and
an arc-shaped portion extending from the straight portion to the other edge of the circumferential land region, and
the combined sipes include
a first combined sipe in which the maximum depth of its arc-shaped portion is larger than the maximum depth of its straight portion, and
a second combined sipe in which the maximum depth of its straight portion is larger than the maximum depth of its arc-shaped portion, the circumferential land region comprises a plurality of blocks divided by lateral grooves extending across the entire width of the circumferential land region, each of the blocks is provided with sipes which are a pair of the first combined sipe and the second combined sipe and a longitudinal sipe extending between the first combined sipe and the second combined sipe, and in each of the blocks, a chamfer extending obliquely between a ground contacting top surface and a side surface of the block is provided on only an in-between part of the block between the first combined sipe and the second combined sipe.

6. The pneumatic tire according to claim 5, wherein the tread portion is provided with a plurality of said circumferential land regions each circumferentially divided into said blocks.

7. The pneumatic tire according to claim 5, wherein the tread portion is provided on each side of the tire equator with an axially inner crown main groove and an axially outer shoulder main groove both extending continuously in the tire circumferential direction, said circumferential land region is defined between the crown main groove and the shoulder main groove on each side of the tire equator, and a crown land portion defined between the crown main grooves is provided with parallel wavy sipes extending thereacross.

8. The pneumatic tire according to claim 7, wherein the tread portion comprises a shoulder land region defined between said shoulder main groove and an adjacent tread edge, the shoulder land region is circumferentially divided by shoulder lateral grooves into shoulder blocks, and the shoulder blocks are each provided with zigzag sipes extending thereacross.

9. A pneumatic tire comprising a tread portion provided with a circumferential land region, the circumferential land region provided with a plurality of combined sipes, wherein:

each of the combined sipes is composed of
   a straight portion extending from one edge toward the other edge of the circumferential land region, and
   an arc-shaped portion extending from the straight portion to the other edge of the circumferential land region, and the combined sipes include
   a first combined sipe in which the maximum depth of its arc-shaped portion is larger than the maximum depth of its straight portion, and
   a second combined sipe in which the maximum depth of its straight portion is larger than the maximum depth of its arc-shaped portion, the maximum depth (d1) of the arc-shaped portion of the first combined sipe and the maximum depth (d4) of the straight portion of the second combined sipe are in a range from 0.65 to 0.75 times the depth (d5) of a crown main groove disposed adjacently to the circumferential land region on the axially inside thereof, the maximum depth (d2) of the straight portion of the first combined sipe and the maximum depth (d3) of the arc-shaped portion of the second combined sipe are in a range from 0.45 to 0.55 times the depth (d5) of the crown main groove, and the first and second combined sipes have a length L3 in the tire axial direction, and each of the first and second combined sipes has a portion having its maximum depth (d1, d4) of which length (L4) in the tire axial direction is 0.30 to 0.40 times the length L3.

10. The pneumatic tire according to claim 9, wherein the straight portion is inclined at an angle of from 30 to 40 degrees with respect to the tire axial direction.

11. The pneumatic tire according to claim 9, wherein the angle of the arc-shaped portion with respect to the tire axial direction is gradually decreased from said other edge toward the straight portion.

12. The pneumatic tire according to claim 9, wherein the length in the tire axial direction of the straight portion is greater than the length in the tire axial direction of the arc-shaped portion.

13. The pneumatic tire according to claim 9, wherein the circumferential land region comprises a plurality of blocks divided by lateral grooves extending across the entire width of the circumferential land region, and each of the blocks is provided with a pair of the first combined sipe and the second combined sipe.

14. The pneumatic tire according to claim 13, wherein the lateral grooves include a first lateral groove provided therein with a tie bar raising from the groove bottom on one side in the tire axial direction, and a second lateral groove provided therein with a tie bar raising from the groove bottom on the other side in the tire axial direction, and each of the blocks is disposed between the first lateral groove and the second lateral groove which are adjacent to the block.

15. The pneumatic tire according to claim 14, wherein each of the tie bars is provided in its radially outer surface with an in-groove sipe.

16. The pneumatic tire according to claim 13, wherein each of the lateral grooves has a main portion inclined in the same direction as the straight portions of the combined sipes to extend parallel to the straight portions.

17. The pneumatic tire according to claim 9, wherein the arc-shaped portion is positioned axially inside the straight portion.

18. The pneumatic tire according to claim 9, wherein the angle of the arc-shaped portion with respect to the tire axial direction is gradually decreased towards the straight portion from the other edge.

19. The pneumatic tire according to claim 9, wherein the tread portion is provided with a plurality of the circumferential land regions with the combined sipes, which include a pair of shoulder land regions as the axially outermost circumferential land regions, each of the shoulder land regions is provided with shoulder lateral grooves which include first shoulder lateral grooves extending axially outwardly from an axially-inwardly-adjacent circumferentially-continuously-extending shoulder main groove and terminated in a vicinity of the tread edge, and a second shoulder lateral groove extending axially outwardly from the shoulder main groove beyond the axially outer ends of the first shoulder lateral grooves.

* * * * *